Aug. 17, 1965  R. C. WESTVEER  3,201,151
PIPE COUPLING HAVING LATCHING AND LOCKING MEANS
Filed April 17, 1962  4 Sheets-Sheet 3
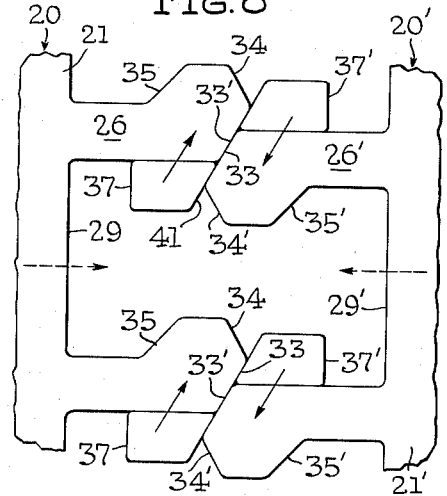
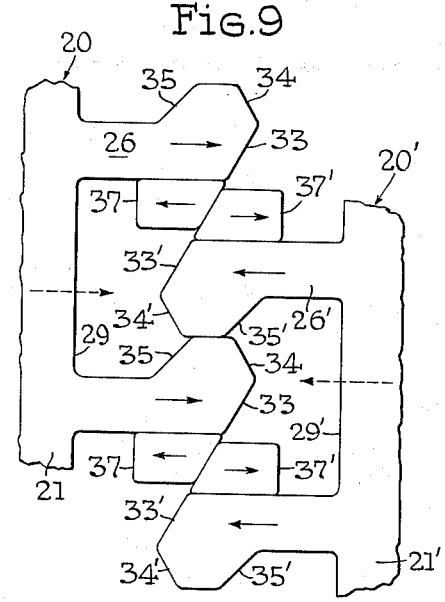
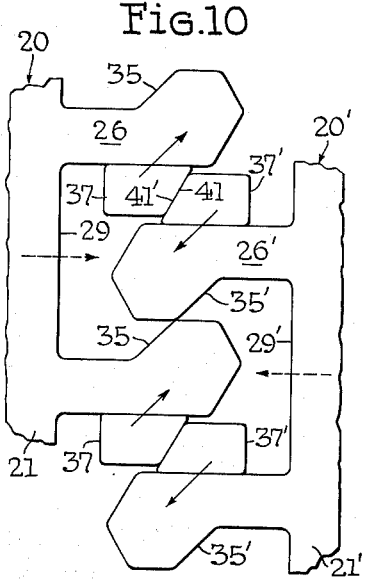
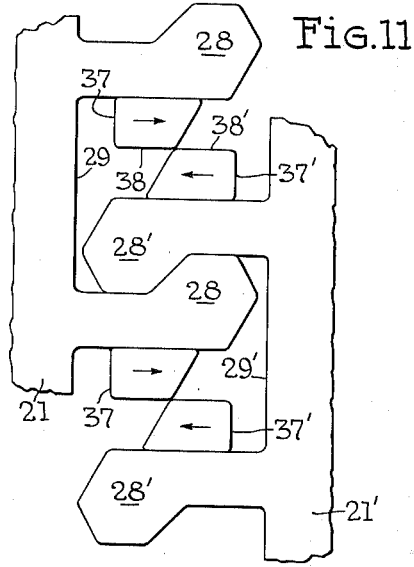
INVENTOR
Robert C. Westveer
BY Dodge and Sons
ATTORNEYS Aug. 17, 1965 R. C. WESTVEER 3,201,151
PIPE COUPLING HAVING LATCHING AND LOCKING MEANS
Filed April 17, 1962 4 Sheets-Sheet 4
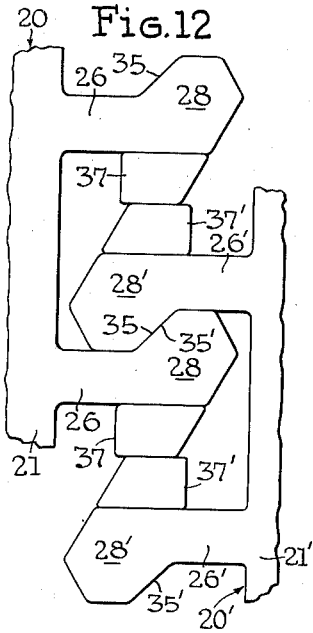
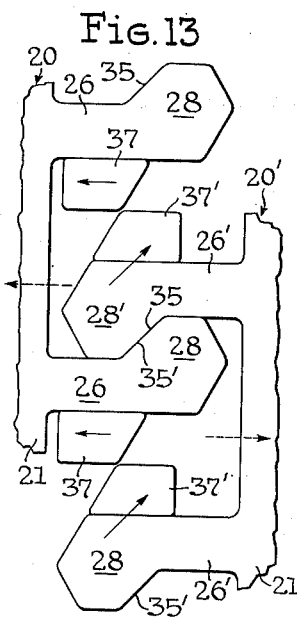
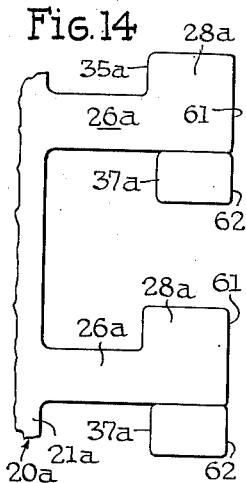
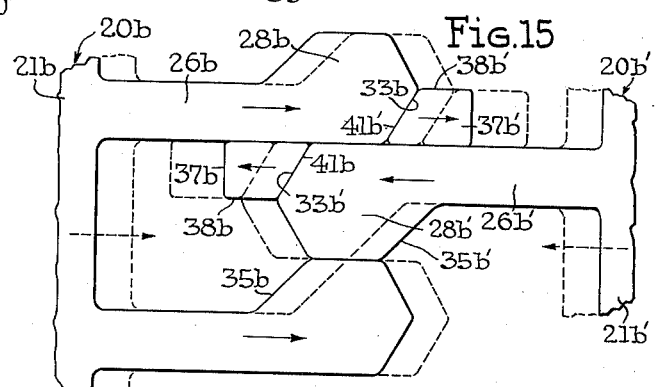
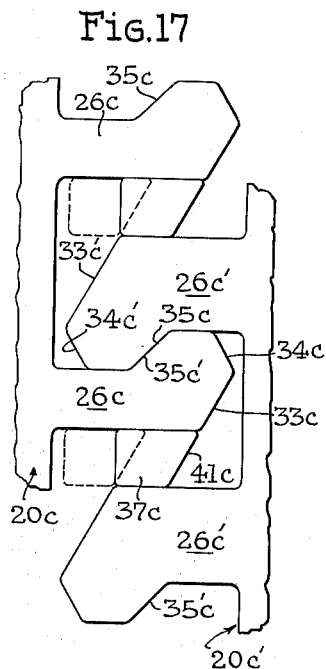
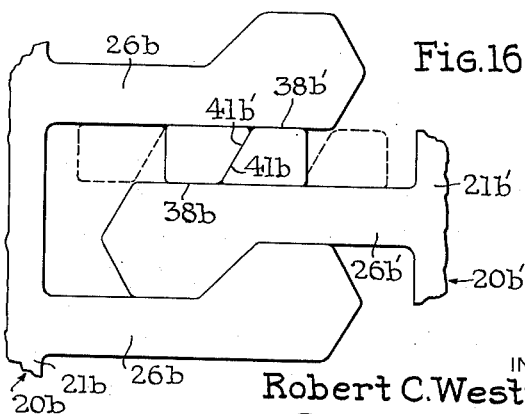
INVENTOR.
Robert C. Westveer
BY Dodge and Sons
ATTORNEYS.

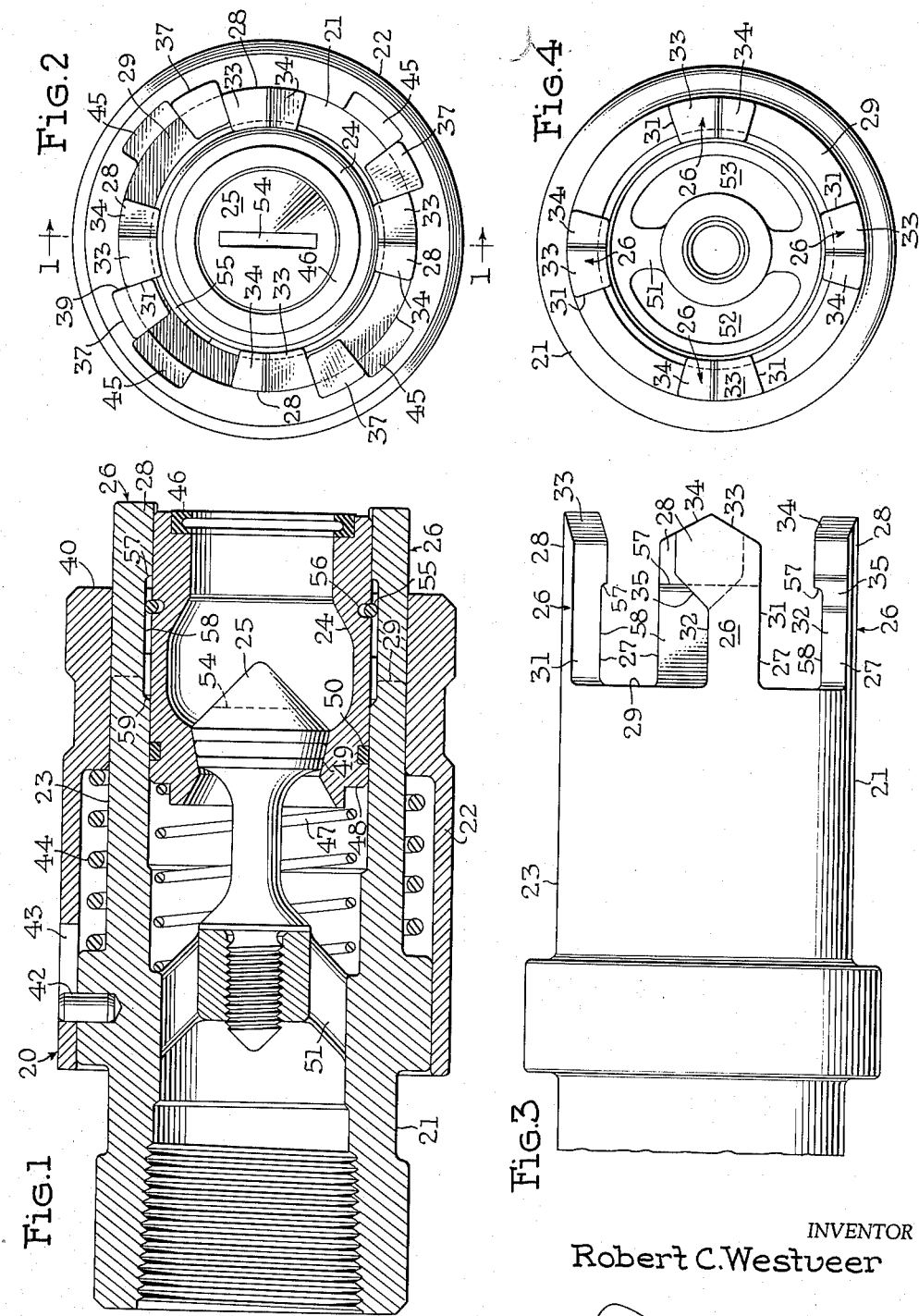

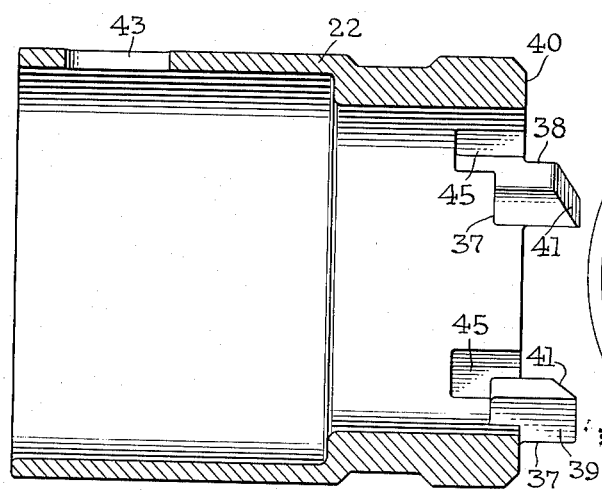
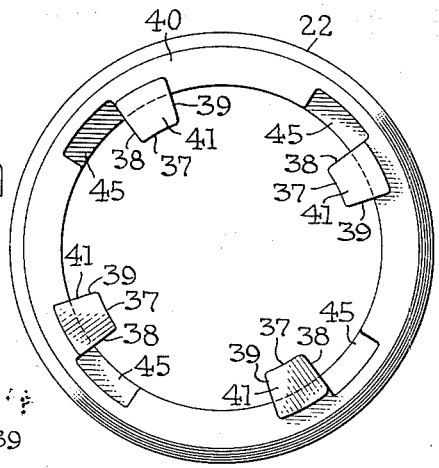
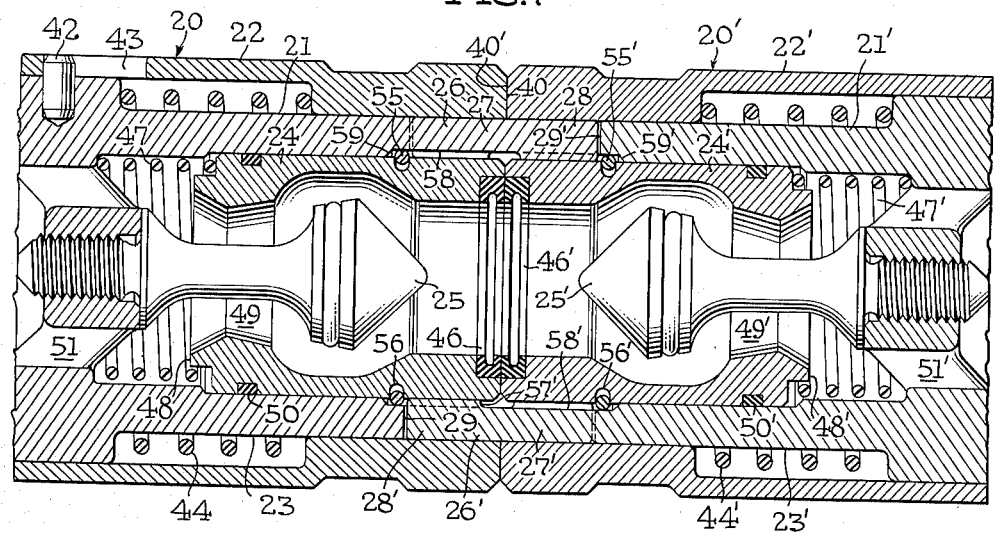

United States Patent Office 3,201,151
Patented Aug. 17, 1965

3,201,151
PIPE COUPLING HAVING LATCHING AND LOCKING MEANS
Robert C. Westveer, Kalamazoo, Mich., assignor to The New York Air Brake Company, a corporation of New Jersey
Filed Apr. 17, 1962, Ser. No. 188,125
11 Claims. (Cl. 285—73)

This invention relates to quick-disconnect couplings.

The object of the invention is to provide a coupling composed of a pair of mating units which can be joined and separated easily and which are equipped with a latching and locking mechanism of relatively simple construction that minimizes wear and tolerance accumulation and thus insures a tight joint. In its preferred form, the invention is intended for use in connection with high pressure (i.e., pressures on the order of 2,500 p.s.i.) hydraulic hoses and provides coupling units which are equipped with face seals and anti-drip check valves. In order to increase versatility, the coupling units of this embodiment are identical. The mechanism of this invention requires relative rotation of the coupling units in opposite senses to effect latching and unlatching, and in the preferred embodiment, these operations are facilitated by cam surfaces that automatically produce the required rotation when longitudinally directed coupling and uncoupling forces are applied to the units.

The preferred embodiment, and several alternates, are described herein with reference to the accompanying drawings in which:

FIG. 1 is a sectional view of one of the coupling units taken on line 1—1 of FIG. 2.

FIG. 2 is an end view of the prong-carrying end of one of the coupling units.

FIG. 3 is an elevation view of a portion of the intermediate tubular member.

FIG. 4 is an end view of the prong-carrying end of the intermediate tubular member.

FIG. 5 is an axial sectional view of the outer tubular member.

FIG. 6 is an end view of the finger-carrying end of the outer tubular member.

FIG. 7 is an axial sectional view of portions of a pair of coupled units.

FIGS. 8–11 are developments of several mating prongs and fingers showing various stages of the coupling operation.

FIG. 12 is a development of several prongs and fingers showing the prongs in latched position and the fingers in locking position.

FIG. 13 is a development similar to FIGS. 8–12 illustrating one method of unlocking the latched prongs.

FIG. 14 is a development of a pair of modified prongs and fingers that are formed without cam surfaces.

FIGS. 15 and 16 are developments of mating latching prongs and fingers of another embodiment of the invention.

FIG. 17 is a development of several mating prongs and fingers of a fourth embodiment of the invention.

Referring to the drawings, the coupling unit 20 comprises four main parts, namely, an intermediate tubular member 21, an outer tubular member 22 which is guided for sliding movement along the circular cylindrical outer peripheral surface 23 of member 21, an inner tubular member 24 guided for reciprocation and rotation within member 21, and a check valve head 25. Tubular member 21 is threaded at one end for connection to a high pressure hydraulic hose, and at its other end is formed with four equiangularly spaced longitudinally extending identical latching prongs 26. Each prong 26 comprises a stem 27 that projects forward from the main part of member 21 and is formed at its outer end with a circumferentially extending latch portion 28. As shown in FIG. 11, the longitudinal distance between each latch portion 28 and the end face 29 of the main body of member 21 is greater than the length of the latch portion so that each prong may interlock with a prong of a mating coupling unit.

The sides of the prongs are formed with faces 31 and 32 that lie in radial planes, and, at its outer end, each prong is formed with two intersecting cam surfaces 33 and 34. Surfaces 33 and 34 are so arranged that whenever they are pushed into abutment with the corresponding surfaces 33′ and 34′ of a mating prong (see FIGS. 8 and 9) the tubular members 21 and 21′ of the mating coupling units are rotated relatively to each other and the prongs are brought into register with the circumferential spaces between adjacent prongs of the other unit. Each prong 26 is formed with a third cam surface 35 at the rear end of latching portion 28 that lies against a corresponding surface on the mating prong 26′ when two units are joined and which is arranged to produce relative rotation of the coupling unit in the unlatching direction when longitudinally-directed separating forces are applied to the coupled units. The cam surfaces 33, 34 and 35 are right helicoids and in a typical case the lead angle of surfaces 33 and 34 is 30° and the lead angle of surface 35 is 45°.

Outer tubular member 22 is formed at one end with four circumferentially-spaced longitudinally-extending identical locking fingers 37 whose side faces 38 and 39 lie in radial planes and which are so positioned that the face 39 of each finger is adjacent the face 31 of one prong 26. As can be seen in FIG. 2, a portion of each finger 37 lies in the common annular zone defined by the inner and outer peripheral surfaces of the latching prongs 26. Each finger 37 is formed with a cam surface 41 at its outer end which is a right helicoid having the same lead angle as the cam surfaces 33 on prongs 26 and which in one limiting position of the member 22 relative to member 21 (termed the locking position for convenience), forms a continuation of surface 33 of the adjacent prong as shown clearly in FIG. 8. Member 22 is movable to the left relatively to member 21 from the locking position of FIG. 1 to a second limiting position (termed the unlocking position) in which, as shown in FIG. 13, the fingers 37 are out of engagement with the adjacent fingers 37′ of the mating coupling unit. The limiting positions of the member 22 are defined by a pin 42 that is carried by member 21 and rides in a slot 43 formed through member 22, and this pin and slot also maintain the desired angular orientation of the two members. A coil compression spring 44 housed in an annular space defined by the inner periphery of member 22 and the outer periphery 23 of the member 21 biases member 22 to the locking position. The circumferential width of each locking finger 37 is approximately one-half of the circumferential distance between adjacent pairs of interlocked prongs when two units are coupled so that, as shown in FIG. 12, these spaces between interlocked prongs are substantially filled by pairs of fingers. Adjacent each finger 37 is a recess 45 of greater circumferential width than the finger and positioned to receive a locking finger 37′ of the mating unit when two units are joined. The recesses 45 are slightly longer than the distance fingers 37 project from end face 40 of member 22 so that when two units are coupled together the annular end faces 40 and 40′ of members 22 and 22′, respectively, abut. With this arrangement, the prongs 26 and 26′ and fingers 37 and 37′ of the coupled units are completely covered by members 22 and 22′ and protected from dirt and accidental injury.

Inner tubular member 24 carries at its right end, as viewed in FIG. 1, an elastic face seal 46 that projects slightly (about .020 inch) beyond the end of member 24 and engages a similar seal 46' on the member 24' of the mating unit when two units are joined (see FIG. 7). The member 24 is so positioned in the longitudinal direction that the seals 46 and 46' are engaged before the prongs 26 and 26' interlock. Member 24 is urged toward the prong-carrying end of tubular member 21, and thus in a direction to increase contact between the face seals when two units are coupled, by a coil compression spring 47 and by the force developed by the pressure in member 21 acting on end face 48. It will be observed that face seal 46 is mounted in a counterbore in the end of member 24 and that it, therefore, is completely surrounded by an annulus of the material from which member 24 is made. This is a desirable arrangement in couplings intended to handle fluids at pressures above about 500 p.s.i. because it prevents extrusion of the seal material through the small clearance spaces between mating prongs and fingers. An O-rong 50 encircling member 24 prevents leakage through the clearance space between the outer periphery of this member and the inner periphery of member 21.

Adjacent its left end, member 24 is formed with a check valve seat 29 arranged to close against the head of check valve 25 and prevent leakage from the hose that carries the coupling unit when the units are disconnected. Check valve head 25 is threaded into the hub of the web 51 of tubular member 21 which defines the arcuate flow passages 52 and 53 (see FIG. 4). Check valve 25 is optional and, therefore, to facilitate installation and removal its head is formed with a screw driver slot 54. When the check valve 25 is employed, it acts as a stop for limiting movement of member 24 and prevents spring 47 from ejecting this member from member 21. In those cases where the check valve is not used, movement of member 24 to the right relatively to member 21 is limited by a split snap ring 55 that is received in a circumferential groove 56 surrounding member 24 and arranged to abut shoulder 57 of an undercut 58 formed in the inner peripheral surfaces of prongs 26. Intentional removal of member 24 from member 21 is effected by shifting outer tubular member 22 back against the bias of spring 44 to expose those portions of ring 55 between adjacent prongs 26 and then depressing the ring into its groove 56 so that it will clear shoulder 57 when member 24 is drawn forward. The other end of undercut 58 is formed with a shoulder 59 which, together with snap ring 55, serves as a stop for limiting movement of member 24 in the opposite direction (i.e., away from the prong-carrying end of tubular member 21). A limit stop for this direction of motion is essential in those cases where the check valve is used in order to prevent the pressure forces acting on members 24 and 24' from shifting these members to a position in which one of the check valves in the coupled units is closed. Thus, if the direction of flow is from right to left in FIG. 7, the pressure acting on face 48' is higher than the pressure acting on face 48, due to the flow restriction afforded by heads 25 and 25', and the abutting members 24 and 24' will tend to shift in unison to the left. This movement will be arrested when snap ring 55 abuts shoulder 59 before seat 49' has moved an appreciable distance toward its head 25' from the fully open position. Similarly, when the direction of flow is from left to right, ring 55' and shoulder 59' will prevent seat 49 from moving an appreciable distance toward its head 25.

Because of the presence of the cam surfaces 33, 34 and 41, it is not necessary to maintain any particular rotational orientation of mating units 20 and 20' as they are brought into coupling engagement. However, for purposes of discussion it will be assumed that the mating prongs and fingers are aligned as shown in FIG. 8 at the start of the coupling operation.

In order to couple the two units, the operator grasps a hose in each hand and pushes them together in the directions of the dashed arrows in FIG. 8. The abutting cam surfaces 33 and 41, on the one hand, and 33' and 41', on the other hand, cause the coupling units 20 and 20' to rotate as they advance, as shown by the solid arrows, and bring the associated prongs 26 and 26' into registry with the circumferential spaces between adjacent prongs on the opposite unit as shown in FIG. 9. During the course of this movement, the face seals 46 and 46' are engaged. After the prongs reach the positions shown in FIG. 9, the continued application of the coupling forces causes the prongs 26 and 26' to move forward relatively to the associated fingers 37 and 37' against the biases exerted by springs 44 and 44'. Since the circumferential space between each adjacent pair of prongs in each of the units 20 and 20' is substantially filled by a prong 26 and 26' of the mating unit and by the abutting fingers 37 and 37', the units do not rotate as the prongs move from the position of FIG. 9 to the position of FIG. 10.

When the prongs 26 and 26' reach the position of FIG. 10, in which cam surfaces 35 are slightly beyond the cam surfaces 35', the units are again rotated relatively to each other by cam surfaces 41 and 41'. Therefore, the prongs and fingers commence to move in directions parallel with the cam surfaces 35 and 35' as shown by the solid arrows. Since these cam surfaces 35 and 35' have a greater lead angle than the cam surfaces 41 and 41' on the locking fingers 37 and 37', respectively, this movement is accompanied by a small longitudinal movement of the intermediate tubular members 21 and 21' relatively to the associated outer tubular members 22 and 22', respectively. When the parts reach the positions shown in FIG. 11, the latch portions 28 and 28' of mating prongs are interlocked and the side faces 38 of fingers 37 will be spaced slightly from the side faces 38' of the fingers 37'. Springs 44 and 44' now advance the outer members 22 and 22' relatively to the intermediate members 21 and 21' thereby bringing the fingers to the locking postions of FIG. 12 and causing annular end faces 40 and 40' to abut.

Because of the presence of the cam surfaces 35 and 35', the application of longitudinally-directed uncoupling forces (resulting either from the fluid pressure in members 21 and 21' or from external loads acting on the hoses) tends to rotate the coupling units 20 and 20' relatively to each other in the direction that disengages the interlocked latch portions 28 and 28'. However, since fingers 37 and 37' fill substantially the entire circumferential space between each pair of interlocked prongs 26, 26', rotation of the units is prevented and the units remain coupled. Although the rotational components of the uncoupling forces generated by the pressure within the units can become quite large, this presents no problem because the locking fingers 37 and 37' are loaded only in compression.

The two units 20 and 20' may be uncoupled by grasping the outer tubular members 22 and 22' and pulling them back against the bias of springs 44 and 44' to shift the fingers 37 and 37' out of side-by-side engagement, i.e., to shift the fingers to the positions shown in FIG. 11. After the fingers reach these positions, the continued application of the separating forces causes cam surfaces 35 and 35' to slide past each other and rotate the latching portions 38 and 38' out of interlocking engagement. When the prongs 26 and 26' have moved to the positions shown in FIG. 10, the prongs 26 and 26' of members 21 and 21' can be withdrawn in the longitudinal direction from the circumferential spaces between adjacent prongs on the other member. At this time, springs 47 and 47' cause members 24 and 24' to move toward the prong carrying ends of the associated intermediate tubular members 21 and 21' and bring seats 49 and 49' into engagement with the valve heads 25 and 25', respectively. Closure of the check valves prevents loss of fluid from the hoses to which the units are attached.

Since the members 22 and 22' in the illustrated embodiment may move twice as far as required to unlock the fingers 37 and 37', i.e., each member may move a distance slightly greater than the length of engagement of side faces 38 and 38', the units also may be uncoupled by shifting only one of the members 22 and 22'. Thus, as shown in FIG. 13, fingers 37' are left in their locking position and fingers 37 are retracted the entire distance required to effect unlocking. After the fingers 37 reach the positions shown in FIG. 13, the continued application of a separating force to unit 20 rotates the prongs out of interlocking engagement and ultimately separates the two units. The ability to uncouple the units by this procedure is a real advantage in those cases in which one of the units is beyond the reach of the operator or is inaccessible.

It should be noted here that the relative rotation of the coupling units required during the coupling and uncoupling operations is not impeded by the abutting face seals 46 and 46', even though these seals are in engagement for a major part of each of these operations, because the inner tubular members 24 and 24' that carry the seals are free to rotate relatively to the intermediate and outer members 21, 21' and 22, 22'. In other words, the engaged face seals 46 and 46' need not slide past each other during either the coupling or uncoupling operations. It might also be mentioned here that since these operations require relative rotation of the two units 20 and 20', the hoses or tubes to which the units are connected must be flexible enough to permit such motion.

FIG. 14 illustrates a modified form of the invention in which the prongs 26a and locking fingers 37a are formed with end faces 61 and 62, respectively, and the latching portion 28a is formed with a rear face 35a, that lie in planes that are normal to the longitudinal axis of the coupling unit. Since this embodiment omits the cam surfaces, the units must be rotated relatively to each other by the operator in order to effect coupling and uncoupling. In this case it is not sufficient merely to push the two units together or pull them apart.

In the embodiment of FIGS. 15 and 16, the circumferential space between the adjacent prongs 26b and 26b' of each member 21b and 21b' is just slightly wider than the circumferential width of the end of a prong, and the mating prongs are locked in engagement by fingers 36b and 36b' whose cam surfaces 41 and 41', rather than side faces 38b and 38b', are in engagement when the units are coupled. During the coupling operation, these untis 20b and 20b' are pushed together, as in the embodiment of FIGS. 1–13, to cause the cam surfaces 33b and 33b' on the prongs and the surfaces 41b and 41b' on the fingers to rotate the units 20b and 20b' to a position in which each prong on one unit registers with a space between adjacent prongs on the mating unit. The prongs 26b and 26b' are then pushed forward relatively to the associated fingers 37b and 37b' as shown in FIG. 15 to the positions indicated by dashed lines. During this movement, the prongs 26b of unit 20b push back the fingers 37b' of unit 20b' and prongs 26b' of unit 20b' push back the fingers 37b of unit 20b so that both the prongs and the fingers are shifted in the longitudinal direction. When the prongs reach the positions indicated by the dashed lines in FIG. 15, cam surfaces 35b and 35b' are permitted to slide past each other and the units rotate to the interlocking position shown in FIG. 16. When the prongs interlock they are out of the path of travel of the fingers on the mating unit and the springs reacting against the tubular members that carry the fingers move the fingers into end engagement. The width of the fingers is approximately equal to the width of the circumferential space between adjacent interlocked prongs and, therefore, when the fingers are in the FIG. 16 position, the prongs cannot be rotated out of interlocking engagement. In order to uncouple the units 20b and 20b' of FIGS. 15 and 16, it is necessary to retract fingers 37b and 37b' to the positions shown by the dashed lines in FIG. 16 so that the mating cam surfaces 35b and 35b' can rotate the prongs out of interlocking engagement.

Since the circumferential spaces between adjacent prongs in the embodiment of FIGS. 15 and 16 are smaller than the corresponding spaces in the embodiments of FIGS. 1–14, this embodiment permits the use of prongs of greater width. However, this advantage is offset somewhat by the fact that both sets of locking fingers 37b and 37b' must be retracted in order to uncouple the units. furthermore, the third embodiment inherently requires longer prongs.

In each of the embodiments described thus far the two coupling units are identical and, therefore, any two units of the same size may be coupled together. While the identical end type of unit affords important advantages, it should be understood that some of the features of this invention can be used in couplings having non-identical units. One such unit is illustrated in FIG. 17. In this embodiment, the unit 20c is identical to the unit 20 of FIGS. 1–13, but the unit 20c' employs no outer tubular member corresponding to member 22' of the first embodiment and the width of its prongs 26c' have been increased by the width of a finger 37'. Thus, as in the case of the third embodiment (FIGS. 15 and 16) the locking finger 37c substantially fills the circumferential space between interlocked prongs. During the coupling and uncoupling operations, fingers 37c are retracted to the positions shown in dashed lines in FIG. 17 in order to permit prongs 26c and 26c' to rotate into and out of interlocking engagement. This embodiment employs cam surfaces 33c, 34c, 35c, 41c, 33c', 34c' and 35c', so this rotation is produced automatically when the two units are pushed together or pulled apart. While the fourth embodiment is not as versatile as those described previously, it is useful in those cases where one of the units (in this case unit 20c') is fixed to some stationary structure, and there is no chance that the operator will attempt to mate it with a similar unit, because of the savings that can be effected by eliminating the outer tubular member and its biasing spring.

As stated previously, the drawings and description relate mainly to the preferred embodiment of the invention. Since many changes, some of which have been described, can be made in the structure of this embodiment without departing from the inventive concept, the following claims should provide the sole measure of the scope of the invention.

What is claimed is:

1. A coupling having two identical coupling units adapted to interlock with each other, each coupling unit comprising:

(a) a first tubular member carrying at one end a plurality of circumferentially-spaced longitudinally-extending identical latching prongs, each prong having a stem fixed at one end to the tubular member and provided at its other end with a circumferentially-extending latch portion, the latch portions lying in a common annular zone and extending in the same circumferential direction from their associated stem portions, the latching prongs being so arranged that when the two units are joined, the latching prongs of each unit are insertable longitudinally into the circumferential spaces between adjacent prongs of the other unit where, upon relative rotation of the two units in one direction, the latch portions are caused to interlock and prevent longitudinal separation of the units without relative rotation of the two units in the opposite direction;

(b) a second tubular member encircling the first tubular member and slidable in the longitudinal direction relatively thereto between first and second positions;

(c) a plurality of circumferentially-spaced identical fingers extending longitudinally from one end of the second tubular member and arranged so that one finger is positioned adjacent each prong on the side opposite the side from which the latch portion extends, at least a portion of each finger lying in said common annular zone;

(d) the circumferential space in said zone between the latch portion of each prong and the adjacent prong being large enough to receive at least one finger and one prong, and the circumferential distance between interlocked prongs being approximately equal to the combined circumferential width of two fingers;

(e) the locking fingers being positioned adjacent the said other ends of the associated prongs when the second tubular member is in the first position so that when the two units are joined and their prongs are interlocked the circumferential space between each adjacent pair of interlocked prongs is substantially filled by a pair of fingers in side engagement, each pair of fingers including a finger from each coupling unit, and the fingers being movable longitudinally a distance not less than one-half the length of said side engagement when the second tubular member is moved to said second position thereby permitting relative rotation of the interlocked coupling units in said opposite direction to disengage the prongs;

(f) and sealing means carried by the first tubular member and arranged to seal the resulting joint when the two coupling units are interlocked.

2. A coupling unit as defined in claim 1 in which
(a) each prong is provided with first and second intersecting cam surfaces at its outer end, the cam surfaces being so arranged that when the first surfaces on the prongs of one unit abut the first surfaces on the prongs on the mating unit the coupling units are rotated relatively to each other in said one direction and the prongs of each unit are caused to register with the circumferential spaces between adjacent prongs of the other unit, and when the second surfaces on the prongs of one unit abut the second surfaces on the prongs of the mating unit the coupling units are rotated relatively to each other in said opposite direction to cause the prongs of each unit to register with the circumferential spaces between adjacent prongs of the other unit; and
(b) each finger is provided at its outer end with a cam surface which, in the first position of the second tubular member, is a continuation of the first cam surface on the associated prong.

3. A coupling as defined in claim 2 in which the latch portion of each prong is provided with a third cam surface that abuts the corresponding cam surface on a prong of the mating coupling unit when the prongs are interlocked, the third cam surfaces being so arranged that they tend to rotate mated coupling units relatively to each other in said opposite direction when longitudinally directed separating forces are applied to the coupling units.

4. A coupling as defined in claim 1 in which
(a) the second tubular member is formed to receive the locking fingers of the mating coupling unit; and
(b) the second tubular member is provided with an annular surface at said one end that lies in a plane normal to its longitudinal axis and encircles the locking fingers, said annular surface being positioned to abut the corresponding surface of the mating coupling unit when the units are joined and the second tubular members are in their first positions.

5. A coupling as defined in claim 1 in which
(a) the first tubular member has a cylindrical portion and the latching prongs are formed in one piece with this portion and constitute a longitudinal extension of its wall; and
(b) the fingers are formed in one piece with the second tubular member and project radially inward into said common annular zone.

6. A coupling as defined in claim 1 in which each locking finger is provided at its outer end with a cam surface that serves to rotate the coupling units in said one direction when the two units are pushed together.

7. A fluid coupling having two identical coupling units adapted to interlock with each other, each coupling unit comprising
(a) a first tubular member adapted at one end to join with a fluid conduit and formed at the opposite end with a plurality of circumferentially-spaced longitudinally-extending identical latching prongs, each prong having a stem formed at its outer end with a circumferentially-extending latch portion, the prongs lying in a common annular zone and the latch portions extending in the same circumferential direction from their associated stems, the latching prongs being so arranged that the prongs of each unit are insertable longitudinally into the circumferential spaces between adjacent prongs of the other unit where, upon relative rotation of the two units in one direction, they interlock with the prongs of the other unit and prevent longitudinal separation of the units without relative rotation of the two units in the opposite direction;
(b) a cylindrical guide surface formed on the outer periphery of the first tubular member;
(c) a second tubular member coaxial with and encircling the first tubular member, the inner surface of the second tubular member having a cylindrical portion guided for sliding movement along the guide surface of the first tubular member and a second portion that is spaced radially from the outer surface of the first tubular member to define an intervening annular space, the second tubular member being slidable along the first tubular member between first and second positions;
(d) a coil compression spring located in said annular space and reacting between the first and second tubular members for urging the second tubular member toward said first position;
(e) means preventing relative rotation between the first and second tubular members;
(f) a plurality of circumferentially-spaced identical locking fingers extending longitudinally from one end of the second tubular member and arranged so that one finger is adjacent each prong on the side opposite the side from which the latch portion extends, at least a portion of the fingers lying in said common annular zone, the circumferential width of each finger being approximately equal to one-half the circumferential space between interlocked pairs of prongs and the length of each finger being such that when the coupling units are interlocked and the second tubular member of each is in said first position at least a portion of each finger of one unit is in side engagement with a portion of each finger of the other unit, and when the second tubular member of each unit is moved to said second position the fingers of each unit are moved away from the fingers of the mating unit a distance at least one-half the length of said side engagement;
(g) an annular face on the end of the second tubular member from which the fingers extend that lies in a plane normal to the axis of the member and encircles the fingers;
(h) means defining recess spaces on the inner periphery of the second tubular member and opening through the end from which the fingers extend, there being one recess space adjacent each finger, the spaces being arranged to receive the fingers of the mating coupling unit whereby when the two coupling units are joined and the second tubular members are in their first positions the annular faces are in abutment;
(i) a third tubular member guided for reciprocation and rotation in the first tubular member;
(j) a face seal carried by one end of the third tubular member, the face seal being arranged to engage the corresponding seal of the mating coupling unit when the two units are joined;
(k) a second coil compression spring located within the first tubular member and urging the third tubular member toward the prong-carrying end of the first tubular member;
(l) a limit stop comprising portions carried by the first and third tubular members for limiting movement of the third tubular member in the direction of the prong-carrying end of the first tubular member;
(m) means responsive to the pressure in the first tubular member and carried by the third tubular member for urging the latter member toward the prong-carrying end of the first tubular member; and
(n) means sealing the sliding joint between the first and third tubular members.

8. A coupling as defined in claim 7 in which:
(a) the outer end of each prong is formed with first and second intersecting cam surfaces arranged so that when the first surfaces of the prongs of the two coupling units are abutted the units are rotated relatively to each other in said one direction of rotation and the prongs of each unit are caused to register with the circumferential spaces between adjacent prongs of the other unit, and when the second surfaces of the prongs of the two units are abutted the units are rotated in said opposite direction of rotation to produce registration of the prongs and circumferential spaces;
(b) the outer end of each finger is formed with a cam surface which is a continuation of the first cam surface of the associated prong when the second tubular member is in said first position; and
(c) the latching portion of each prong is formed with a third cam surface that abuts a corresponding cam surface on a prong of the mating coupling unit when the prongs are interlocked, the third cam surfaces being so arranged that they tend to produce relative rotation of the two coupled units in said opposite direction when longitudinally directed separating forces are applied to the units.

9. A coupling as defined in claim 8 in which all of the cam surfaces are right helicoids.

10. A coupling as defined in claim 9 in which the side faces of the prongs and fingers lie in radial planes.

11. A coupling as defined in claim 8 in which
(a) said cylindrical guide surface is on a cylindrical portion of the first tubular member that is formed in one piece with the latching prongs, the prongs constituting a longitudinal extension of the wall of that cylindrical portion; and
(b) the locking fingers are formed in one piece with the second tubular member and project radially inward into said common annular zone.

References Cited by the Examiner
UNITED STATES PATENTS

| 165,415 | 7/75 | Henderson | 137—614.04 |
| 915,985 | 3/09 | Medovarski | 285—86 |
| 1,307,273 | 6/19 | Salley | 285—161 |
| 2,015,786 | 10/35 | Carcano | 285—86 |
| 2,071,750 | 2/37 | Kusebauch | 285—269 |
| 2,204,392 | 6/40 | Arm | 285—73 |
| 2,257,321 | 9/41 | Arnold | 285—33 X |
| 2,816,779 | 12/57 | Jensen | 285—74 |
| 2,958,544 | 11/60 | Wvrzburger | 137—614.03 |

FOREIGN PATENTS

| 64,519 | 4/14 | Austria. |
| 52,710 | 2/37 | Denmark. |
| 710,195 | 6/31 | France. |
| 778,867 | 1/35 | France. |
| 138,388 | 5/30 | Switzerland. |

CARL W. TOMLIN, *Primary Examiner.*
WILLIAM F. O'DEA, *Examiner.*